United States Patent [19]
McLeod

[11] 3,751,243
[45] Aug. 7, 1973

[54] PROCEDURE FOR QUENCHING DROSS

[75] Inventor: Melvin Elliott McLeod, Arvida, Quebec, Canada

[73] Assignee: Alcan Research and Development Limited, Montreal, Quebec, Canada

[22] Filed: Jan. 8, 1971

[21] Appl. No.: 104,961

[52] U.S. Cl.............................. 75/63, 75/24, 75/68, 75/93
[51] Int. Cl...... C22b 7/00, C22b 7/04, C22b 21/00
[58] Field of Search ..................... 75/63, 68, 65, 93, 75/24; 148/26, 27, 13, 125, 143; 266/6, 4; 65/137, 348; 106/117, 51

[56] References Cited
UNITED STATES PATENTS

| 2,754,199 | 7/1956 | Stroup | 75/68 R |
|---|---|---|---|
| 3,043,678 | 7/1962 | Lowry | 75/68 R |
| 3,155,494 | 11/1964 | Heins | 75/68 R |
| 2,538,239 | /1951 | Farnsworth | 148/143 |
| 2,987,407 | /1961 | Ulfstedt | 106/117 |
| 2,895,860 | /1959 | Peras | 148/138 |
| 2,493,339 | /1950 | Campbell | 148/143 |
| 2,403,419 | /1946 | Wilkins | 75/44 |
| 2,688,535 | /1954 | Madaras | 75/30 |

FOREIGN PATENTS OR APPLICATIONS

| 1,170,852 | 5/1964 | Germany | 75/24 |
|---|---|---|---|
| 10,427 | 0/1890 | United Kingdom | 106/117 |

Primary Examiner—L. Dewayne Rutledge
Assistant Examiner—Peter D. Rosenberg
Attorney—Christopher C. Dunham, Robert S. Dunham, P. E. Henninger, Lester W. Clark, Gerald W. Griffin, Thomas F. Moran, Howard J. Churchill, R. Bradlee Boal, Robert Scobey and Henry T. Burke

[57] ABSTRACT

For quenching dross skimmed from a molten aluminum surface, the dross is placed in a container in successive layers separated by layers of particulate salt. Heat is taken up from the dross not only in elevating the temperature of the salt, but also as heat of fusion of the salt. The salt used may comprise one or more components of a salt flux suitable for employment in subsequent procedures to recover free metal from the dross.

6 Claims, 1 Drawing Figure

PATENTED AUG 7 1973  3,751,243
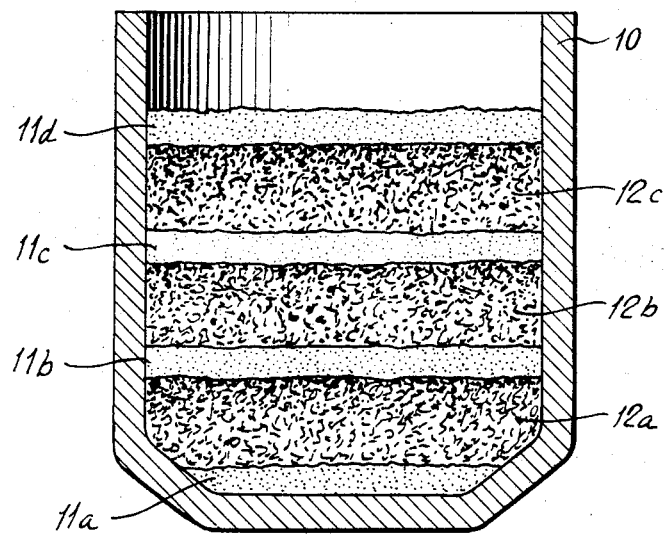
INVENTOR.
MELVIN ELLIOTT McLEOD
BY
Christopher C. Dunham
ATTORNEY

PROCEDURE FOR QUENCHING DROSS

BACKGROUND OF THE INVENTION

This invention relates to the handling of dross such as forms on a molten metal surface, and in a particular sense is directed to procedures for quenching dross formed on a molten aluminum surface. As herein used, the term "aluminum" includes aluminum base alloys.

When a body of aluminum is melted or maintained in molten state in a furnace for purposes such as casting, dross forms on the surface of the molten metal. The dross is periodically removed by skimming or like operations. As thus removed, the dross is typically a pasty or granular material, at or above the temperature of the furnace, containing a substantial amount of free aluminum metal as well as aluminum oxide and other nonmetallic compounds.

For reasons of economy, it is desirable to recover in usable form as much as possible of the free metal that is carried from the furnace in the dross. Various procedures have been proposed for effecting such recovery. One such procedure, wherein the dross is heated in an induction furnace in the presence of a salt flux, is disclosed in the U. S. Pat. application of Melvin Elliott McLeod, John Edward Deutschman, Herbert Warren Percival and Han Spoel, entitled Recovery of Metal from Dross, assigned to the same assignee as the present application, and expected to be filed concurrently herewith. Although the metal is dispersed through the dross as fine particles or globules in intimate mixture with and surrounded by the non-metallic components of the dross, the use of electrical induction heating is found to afford highly effective separation of free metal from the nonmetallics. In an exemplary instance of such procedure, the salt flux and dross are introduced to an induction furnace which already contains a heel of molten aluminum heated by electrical induction utilizing a low frequency current. Recoveries of usable metal above 70 percent of the weight of the dross are attainable in this operation.

It has been found that dross removed from a molten aluminum surface commonly contains as much as 60 – 80 percent by weight free metal. However, this initial recoverable free metal content of freshly skimmed dross may be subject to very great decrease by oxidation unless the dross is rapidly and effectively quenched.

That is to say, the free metal in the more or less porous dross is highly susceptible to oxidation, especially at elevated temperatures. In particular, the dross at furnace temperature (usually a temperature in the range between about 700° and about 800°C) very frequently tends to ignite and to burn, especially under such conditions as high furnace temperature, presence of magnesium in the molten aluminum alloy in the furnace, chlorine fluxing in the furnace, and presence of fluoride salts. Once the dross ignites, its temperature rises e.g. to values as high as 1,000° to 2,000°C. Dross which has ignited in the furnace continues to burn upon removal from the furnace, and dross which has not ignited in the furnace is nevertheless quite likely to ignite after skimming. Such burning rapidly decreases the recoverable free metal content of the dross, owing to oxidation, with a rate of loss of aluminum that may be as high as 1% per minute and may ultimately reduce the free metal content of the dross to as little as 10 – 20 percent by weight.

In use of the aforementioned induction heating procedure for recovery of metal from the dross, it is sometimes possible to avoid loss of free metal content after skimming by transferring the dross immediately to an induction furnace, thereby minimizing the time during which oxidation losses can occur. However, in many instances it is not feasible or convenient to thus deliver freshly skimmed dross to the induction furnace for immediate treatment for metal recovery, and in addition, the induction furnace may have to be located at some distance from the furnace being skimmed, with the result that some substantial transport time necessarily passes between skimming and delivery to the induction furnace.

Thus as a general rule (i.e. except in very special circumstances such as immediate delivery of dross to an induction furnace), preservation of the free metal content of freshly skimmed dross, for subsequent separation and recovery, requires that the dross be very rapidly quenched after skimming at least to a temperature below the melting point of aluminum and very preferably to a temperature below about 500°C. Such quenching prevents ignition and oxidation of free metal in the dross.

Heretofore, various methods have been used or proposed for quenching aluminous dross. For example, the dross after skimming may be air cooled by spreading it with rakes or like tools on an extended surface such as a floor, for exposure to air. The difficulty with this method is that ordinarily the extended floor space required for air cooling is located at some distance from the furnace at which the dross is skimmed, and therefore the dross must be transported through that distance in a suitable container with substantial hazard of ignition during the necessary involved in transport. Further, if the dross has ignited, it must be raked into very thin layers to arrest the burning. In addition to the operational inconvenience involved in the time-consuming steps of collecting, transporting and spreading the dross, the personnel involved in thus handling the dross are exposed to undesirable and unpleasant conditions of heat and dust.

Another quenching method heretofore proposed involves spraying water on the dross to cool it. This again must be performed in a room or locality especially adapted to the purpose, and ordinarily at some distance from the furnace at which the dross is skimmed. The spray quench technique produces undesired conditions of dust and fumes and also creates a substantial potential hazard to operating personnel in that a serious explosion can occur from the reaction of water with hot dross.

Still another known procedure involves contact of the dross with a chilled surface such as a water-cooled steel shaking table to which the dross is fed after being broken up mechanically. The size and cost of the necessary equipment preclude provision of such quenching apparatus adjacent each furnace that is to be skimmed. Therefore, as in the case of the other known procedures referred to above, some delay is usually required for transport of the skimmed dross to the quenching equipment, and during this delay substantial loss of free metal may take place through oxidation.

Thus in summary, the known procedures for quenching dross are commonly attended with inconvenience, expense, and/or even hazard; and (owing especially to the delays involved in transporting freshly skimmed dross to a treating locality) quenching by the procedures just mentioned is frequently only partially effective in preserving the free metal content of the dross; that is, even though the dross may initially contain 60 percent or more free metal, the free metal content after quenching by the foregoing procedures may be as low as 30 – 40 percent.

SUMMARY OF THE INVENTION

An object of the present invention is to provide new and improved procedures for quenching dross skimmed from a molten metal surface, enabling commencement of quenching action essentially immediately upon skimming, and characterized by superior convenience, ease of operation, and freedom from hazard or unpleasant operating conditions. Another object is to provide such procedures for quenching dross skimmed from a molten aluminum surface to preserve a high free metal content in such dross.

To these and other ends, the present invention broadly contemplates, in procedure for quenching dross formed on a molten metal surface, the steps of removing successive quantities of the dross from the molten surface and placing these quantities as plural successive layers of dross in a container while covering each of the layers of dross with a layer of salt essentially immediately upon placing the dross layer in the container and before placing the next layer of dross in the container so that the plural successive layers of dross are separated by layers of salt. The term "salt" as used herein will be understood to embrace either a salt or a mixture of two or more salts.

As applied to the treatment of dross skimmed from a molten aluminum surface, the invention contemplates the use of a salt (in granulated or other solid and more or less finely divided form) which is stable at temperatures ranging up to at least about 800°C and which preferably has a melting point below about 700°C to insure rapid heat absorption from the hot dross. That is to say, the melting point of the salt should be below the temperature of the dross as skimmed from a furnace. When the present method is used in conjunction with the aforementioned induction heating treatment for recovery of free metal from dross, it is advantageous to use, as the salt employed for quenching, one or more constituents of the salt flux to be used in the induction heating operation. Such flux may for example be a mixture of sodium chloride and potassium chloride with or without a minor proportion of a fluoride (e.g. $NaF$ or $CaF_2$) present. Then as the quenched dross is delivered from the quenching container to the induction furnace, the salt carried with it provides at least part of the flux for the metal recovery operation.

The technique of cooling the dross by arranging it in layers separated by layers of salt very effectively quenches the dross, owing to the fact that the heat of the dross is taken up, not only in elevating the temperature of the salt but also as heat of fusion in melting the salt. Virtually all burning or oxidation of metal in the dross after skimming can be avoided so that the free metal content of the dross after quenching remains in the range of about 60 to about 80 percent by weight.

It is important that the layers of dross not be excessively thick, as the quenching action is dependent on transfer of heat from the dross to the salt. A very thick dross layer may ignite and suffer loss of free metal through oxidation, even if covered with a layer of salt. Thus in accordance with further particular features of the invention, each layer of dross is not more than about six inches in thickness and is covered with a layer of salt one to two inches thick. For this quenching operation, about one pound of the salt is needed to quench four to six pounds of the dross; that is to say, an amount of salt equal to about 20 percent (or even somewhat less) of the weight of the dross is sufficient for effective quenching action, and in general, use of salt in an amount between 20 and 25 percent of the weight of dross is ample.

Further features and advantages of the invention will be apparent from the detailed description hereinbelow set forth, together with the accompanying drawing.

BRIEF DESCRIPTION OF THE DRAWING

The FIGURE is a simplified and somewhat schematic elevational sectional view of a steel bucket containing successive alternate layers of dross and salt arranged for quenching of the dross in accordance with the method of the present invention.

DETAILED DESCRIPTION

The method of the present invention may be described as applied to the treatment of the dross that forms on a surface of molten aluminum (i.e. pure metal or aluminum base alloy), as in a furnace where the aluminum is being maintained in molten state for casting or other purposes. It is found that such dross, as removed from the molten aluminum surface, typically contains about 60 to about 85 percent free metal in mixture with aluminum oxide and other nometallic compounds including up to about 2 percent each of nitrides, carbides and fluorides. The removed dross, which is at or above the furnace operating temperature (ordinarily about 700° – 800°C), is usually a pasty or granular material which may, however, harden into large more or less rigid masses upon cooling. As already explained, free aluminum in the dross will oxidize at the skimming temperatures upon exposure to air penetrating the voids of the dross; moreover, particularly in the case of dross at temperatures approaching 800°C, the dross may ignite and burn if indeed it is not already burning when skimmed. Such burning very rapidly increases the temperature of the dross up to as much as 2,000°C and consumes free metal, thereby diminishing the recoverable free metal content of the dross.

Referring to the drawing, in an illustrative embodiment of the method of the present invention, there is provided a relatively large container such as a steel bucket 10 or the like, capable of holding, for example, several hundred pounds of dross. A layer of salt 11a, in dry particulate form, is placed on the bottom of the bucket 10, being shoveled in or otherwise conveiently delivered to the bucket so as to cover the bottom of the bucket with one to two inches of salt. A quantity of dross is then raked or skimmed from the molten metal surface in conventional manner and deposited in the bucket 10, which may be placed conveniently close to the furnace where the skimming operation is taking place. Sufficient dross is placed in the bucket to form a layer 12a e.g. several inches thick on top of the salt layer 11a. In accordance with particular features of the invention, the layer 12a and the further layers of dross subsequently added to the bucket should each be no more than about six inches thick.

Essentially immediately after the layer 12a of dross has been deposited in the bucket, i.e. within at most about one or two minutes after the deposit of such layer and preferably even more rapidly, the dross layer 12a is covered by a second layer 12b of solid particulate salt which may be shoveled in on top of layer 12a or otherwise delivered to the bucket. The salt layer 11b again may have a thickness of one to two inches. In the same manner, successive layers of dross 12b and 12c and intervening or covering layers of salt 11c and 11d are supplied in succession to the bucket until the bucket is substantially filled, the top layer being a layer of salt as indicated at 11d. Thus each of the dross layers (having, as stated, a thickness of not more than about six inches, and in many cases somewhat less) is interposed between two substantially thinner layers of salt, and is separated from the other dross layers by the salt.

The salt may for example be a chloride or a mixture of chlorides with or without a fluoride present, such mixture having a melting point lower than the temperature at which the skimmed dross is delivered to the bucket, and being stable at least up to about 800°C. Heat from the dross elevates the temperature of the salt and causes at least partial fusion of the salt; i.e. much of the heat of the dross is taken up as heat of fusion of the salt. In this way, the dross is rapidly and very effectively quenched. Specifically, the present method enables cooling of the dross from the furnace temperature down to a temperature at least well below the melting point of aluminum and indeed below 500°C within a period of not more than about five minutes or even less (a period of as little as two minutes being frequently attainable) after being skimmed from the furnace in which it has formed. Such quenching is effective to prevent virtually all burning or oxidation of metal in the dross after skimming so that the free metal content of the dross after quenching remains in the range of 60 – 80 percent by weight. Owing to the fact that the steel bucket and a supply of salt can readily be placed next to the furnace being skimmed, the delays and metal losses incident to transport of the dross to a quenching locality (commonly unavoidable in procedures heretofore known for quenching dross) are substantially eliminated. Operational inconvenience is minimized in that no spreading or spraying of the dross is necessary, and the quenching operation of the invention presents no hazard of explosion.

Especially when the dross is to be subjected to a metal recovery operation by the induction heating procedure of the aforementioned U. S. patent application, it is convenient to use as the salt the same flux composition that is to be used for induction heating, or some component or components of that composition. In this regard, it may be mentioned that presently preferred fluxes for the induction heating treatment just mentioned include mixtures of chlorides and fluorides of elements of Groups I and IA, II and IIA, and III of the periodic table of elements. One specific example of a satisfactory flux comprises 45% potassium chloride, 50% sodium chloride, and 5% sodium fluoride, all percentages being by weight. In this flux, the sodium chloride-potassium chloride ratio is eutectic while the sodium fluoride further depresses the melting point. The melting point of the described flux is between about 650° and about 670°C. This mixture, or its constituent chlorides, are suitable for use as the quenching salt in the method of the present invention.

In further specific illustration of suitable fluxes for the induction heating method, calcium fluoride may be used in place of the sodium fluoride in the above-described mixture of salts. Indeed, since fluorides are commonly present in the dross, it is not always necessary to include a fluoride in the flux for the induction heating procedure. A further suitable flux mixture is a naturally occurring salt, commercially available under the trade name "Montanal," which typically contains 66% sodium chloride, 29% potassium chloride, and 2% fluoride. The melting point of the latter salt is about 670° to 680°C.

Use of the salt flux composition as the quenching medium, when the quenched dross is to be subjected to the aforementioned induction heating procedure, is convenient in that the salt and dross can both be introduced to the induction furnace. Again for such practice, another reason for arranging the dross in relatively thin layers in the bucket 10 is to facilitate transfer of the dross to the induction furnace. Although soft and pasty or granular when hot, the dross solidifies into a more or less rigid mass upon quenching, and it is desirable that such mass be small enough for insertion into the induction furnace.

If desired, the dross as thus quenched may be transferred to an induction furnace (or subjected to other metal-recovery treatment) while it is still relatively warm. However, the layered mass of salt and dross may be stored indefinitely if properly covered for protection from moisture. The salts and dross are somewhat hygroscopic; hence it is important that the dross and salt mixture be shielded from atmospheric moisture during any prolonged storage.

By way of more particular illustration of the method of the present invention, reference may be had to a specific example in which dross skimmed from a molten aluminum surface was quenched in a suitably dimensioned steel bucket with layers of a salt mixture provided in solid particulate form and comprising about 45% KCl, 50% NaCl and 5% NaF by weight. Initially, for collection of 600 pounds of dross, about 25 pounds of the salt mixture in particulate form are placed in the bottom of the steel bucket. About 100 – 150 pounds of dross are skimmed into the bucket and then a further addition of about 20 – 40 pounds of salt is made to provide a layer covering this dross. Additional alternate layers of dross and salt in about the same relative proportions are added to the bucket until the skimming operation is completed. Thus in the bucket there are provided a succession of alternate layers of dross and salt with a salt-to-dross ratio of about 0.2 to about 0.25. The salt, absorbing heat from the hot dross, rapidly quenches the dross, reducing the dross temperature to well below 500°C in less than a minute after skimming from the furnace.

It has been found that dross quenched in accordance with the foregoing procedure may be subsequently treated by the induction heating method referred to above to provide a metal recovery of 70 – 73 percent based on the weight of the dross.

It may be explained that, as presently believed, the quenching action of the salt in the method of the present invention is primarily attributable to heat absorption rather than to any effect of the salt in sealing off the dross from air access. As evidence of this, it is found that a very thick dross layer may ignite and suffer loss of free metal through oxidation, even if covered with a layer of salt. For example, if all the dross from a skimming (amounting to e.g. 500 pounds) is placed in a container in a single layer or body and then covered with a single layer of e.g. 100 pounds of salt, the dross will tend to ignite in the container or, if already ignited, will continue to burn.

By way of further illustration, 20 batches of furnace dross ranging in weight from 300 to 972 pounds per batch skimmed from molten aluminum in furnaces were quenched in accordance with the method of the present invention by disposing the dross in relatively thin layers covered by layers of salt. The proportion of metal recovered by subsequent heating of these batches in an induction furnace ranged from 53 – 86 percent with an average of 72 percent based on the weight of the dross. In contrast, in the case of six batches ranging from 374 – 640 pounds of dross, quenched by collection in similar containers but with a layer of salt placed only on top of the dross batch, metal recoveries in an induction furnace ranged from 31 – 65 percent with an average of 49 percent based on the weight of the dross. The metal content of aluminous drosses which are air-cooled by conventional spreading techniques is commonly in the range of 30 – 40 percent, while the metal content of aluminous drosses cooled by a water-cooled steel shaking table is commonly in the range of 50 – 55 percent by weight.

It is to be understood that the invention is not limited to the features and embodiments hereinabove specifically set forth but may be carried out in other ways without departure from its spirit.

I claim:

1. In procedure for quenching dross formed on a molten aluminum surface, the steps of
   a. removing successive quantities of the dross from the molten surface, said dross containing at least a substantial proportion of free metal in intimate mixture with non-metallic material and being spreadable in layers when initially removed from the molten surface, and placing these quantities as plural successive layers of dross in a container while
   b. covering each of said layers of dross with a layer of salt essentially immediately upon placing the dross layer in the container and before placing the next layer of dross in the container so that the plural successive layers of dross are separated by layers of salt, providing at least two layers of dross in said container with a first layer of salt intermediate said two layers of dross and a second layer of salt above the upper one of said two layers of dross, said salt as supplied to the container being in divided solid form and having a melting point lower than the temperature of the dross as delivered to the container from the molten surface.

2. Procedure according to claim 1, wherein said salt comprises at least one chloride selected from the class consisting of sodium and potassium chlorides.

3. In procedure for quenching dross formed on a molten aluminum surface, the steps of
   a. removing successive quantities of the dross from the molten surface, said dross containing at least a substantial proportion of free metal in intimate mixture with non-metallic material and being spreadable in layers when initially removed from the molten surface, and placing these quantities as plural successive layers of dross in a container while
   b. covering each of said layers of dross with a layer of salt essentially immediately upon placing the dross layer in the container and before placing the next layer of dross in the container so that the plural successive layers of dross are separated by layers of salt, said salt as supplied to the container being in divided solid form and having a melting point lower than the temperature of the dross as delivered to the container from the molten surface,
   c. each of said layers of dross being not more than about six inches thick and each of said layers of salt being at least about one inch thick.

4. Procedure according to claim 3, wherein the amount of salt placed in said container is equal to at least about 20 percent by weight of the amount of dross placed in said container.

5. Procedure according to claim 3, wherein a layer of salt is placed in said container prior to placing the first layer of dross in said container.

6. Procedure according to claim 3, wherein said salt comprises a mixture of sodium and potassium chlorides.

* * * * *